United States Patent [19]
Magoteaux

[11] Patent Number: 6,017,054
[45] Date of Patent: Jan. 25, 2000

[54] VEHICLE OCCUPANT PROTECTION APPARATUS

[75] Inventor: David G. Magoteaux, Mesa, Ariz.

[73] Assignee: TRW Inc., Lyndhurst, Ohio

[21] Appl. No.: 08/946,149

[22] Filed: Oct. 7, 1997

[51] Int. Cl.[7] .................................................. B60R 21/16
[52] U.S. Cl. ...................................... 280/728.2; 280/731
[58] Field of Search ................................. 280/728.2, 731, 280/743.1

[56] References Cited

U.S. PATENT DOCUMENTS

| | | | |
|---|---|---|---|
| 4,183,550 | 1/1980 | Sodou | 280/728.2 |
| 5,131,677 | 7/1992 | Horiuchi et al. | 280/731 |
| 5,152,549 | 10/1992 | Aird | 280/728.2 |
| 5,193,846 | 3/1993 | Allard | 280/728.2 |
| 5,263,738 | 11/1993 | Oda et al. | 280/728.2 |
| 5,308,110 | 5/1994 | Kokeguchi | 280/728.2 |
| 5,492,073 | 2/1996 | Abraham | 112/441 |
| 5,505,489 | 4/1996 | Bollaert et al. | 280/728.2 |
| 5,518,266 | 5/1996 | O'Docherty et al. | 280/728.2 |
| 5,549,326 | 8/1996 | Ramos | 280/743.1 |
| 5,570,899 | 11/1996 | Matsuo | 280/728.2 |
| 5,692,771 | 12/1997 | Milne, III et al. | 280/728.2 |

*Primary Examiner*—Kenneth R. Rice
*Attorney, Agent, or Firm*—Tarolli, Sundheim, Covell, Tummino & Szabo L.L.P.

[57] ABSTRACT

An apparatus (10) includes a retainer structure (80), a reaction structure (28), and an inflatable vehicle occupant protection device (14). The retainer structure (80) has a first clamping surface (92). The reaction structure (28) has a second clamping surface (112). The protection device (14) includes a pair of adjacent fabric panels (60, 62) that are clamped between the clamping surfaces (92) and (112). The panels (60, 62) are joined along a seam (68) which is thicker than the panels (60, 62). At least one of the clamping surfaces (92, 112) is discontinuous across the seam (68) to define a gap (114) through which the seam (68) extends. This arrangement provides clearance between the retainer structure (80) and the reaction structure (28) for the thickness of the seam (68).

7 Claims, 4 Drawing Sheets

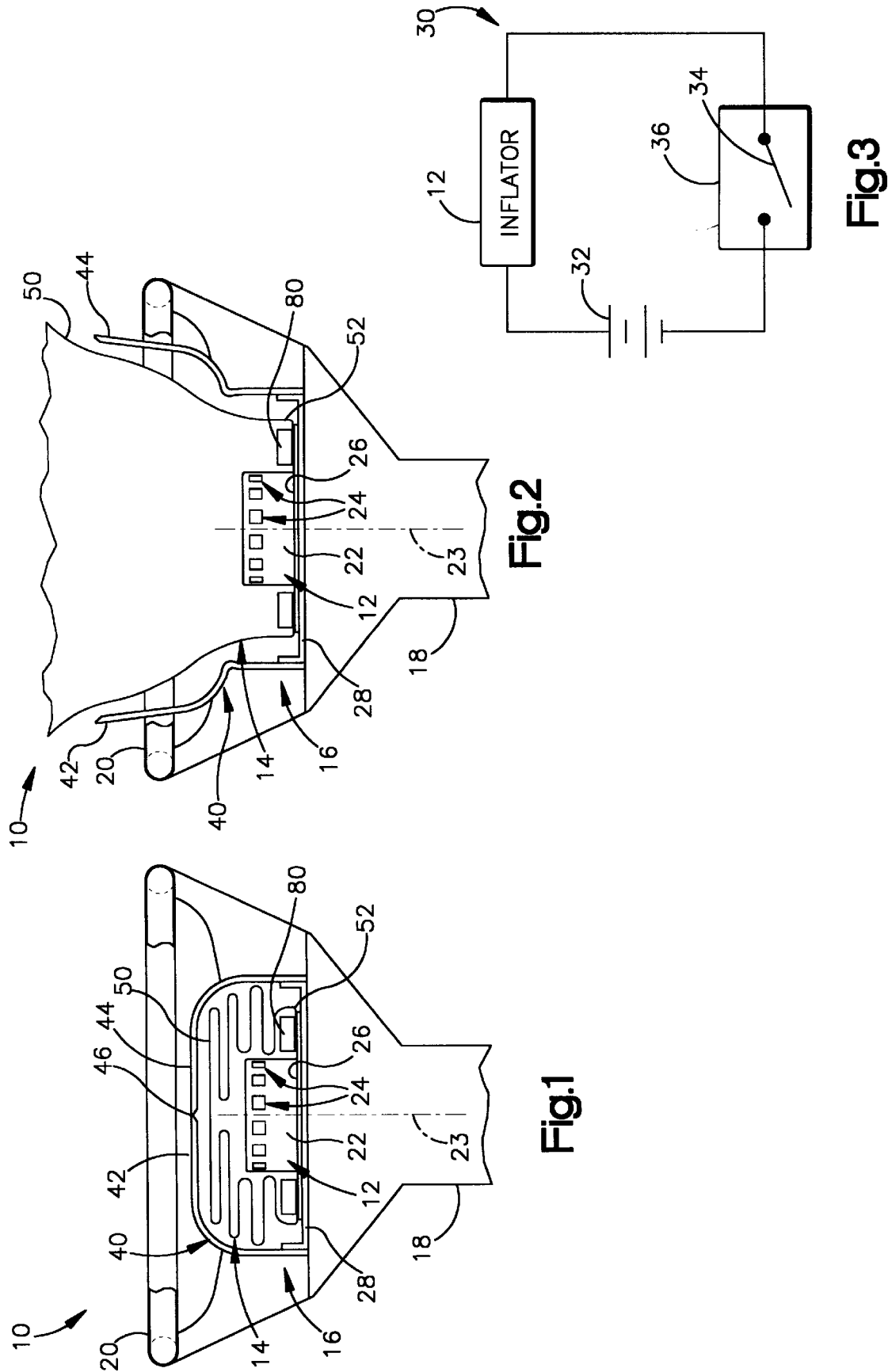

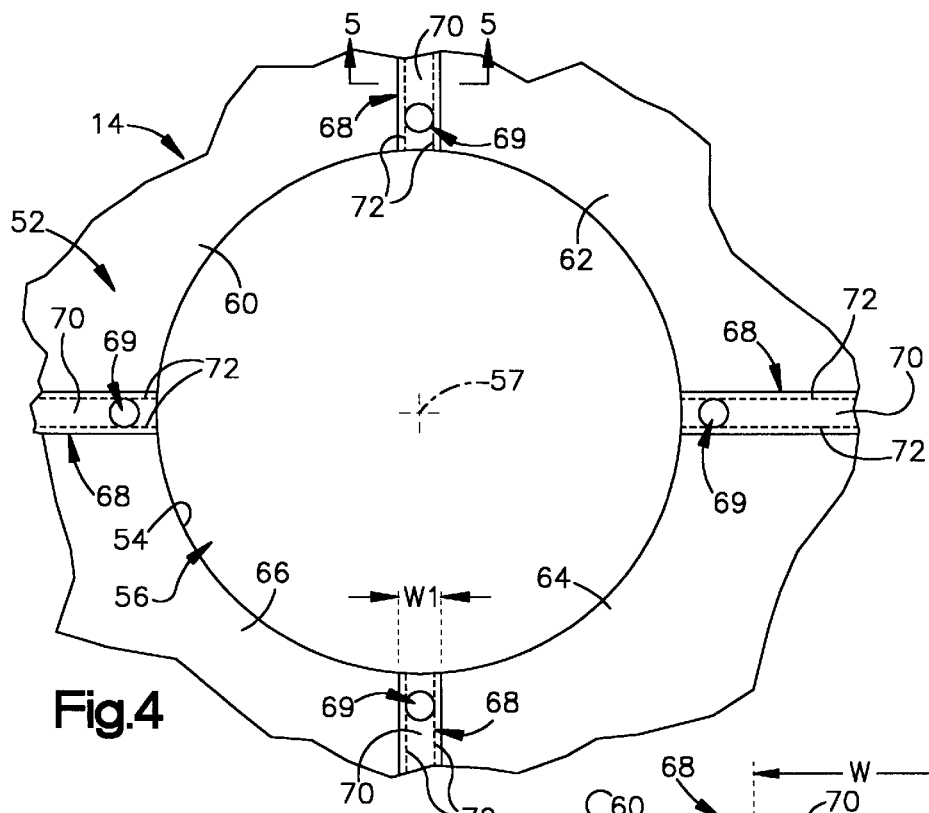
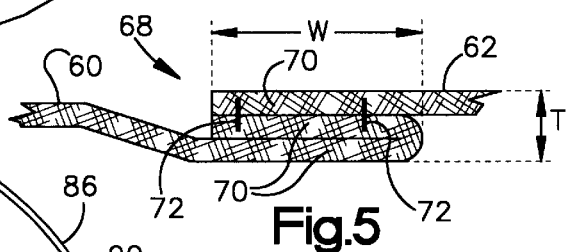
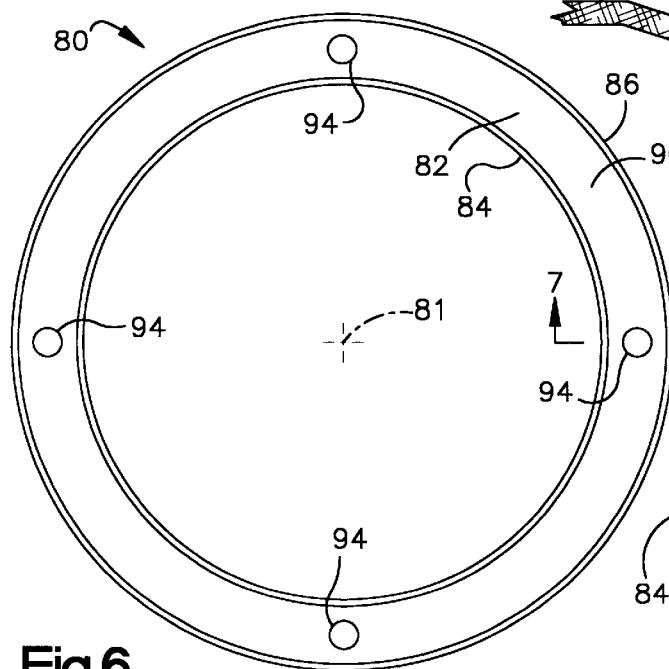
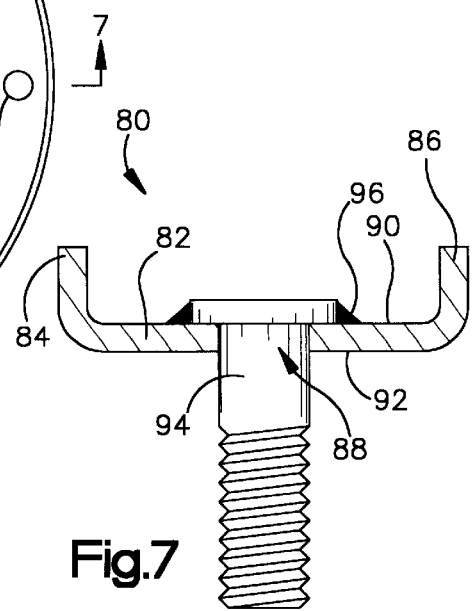

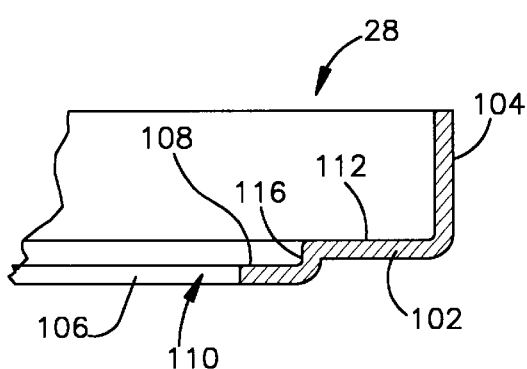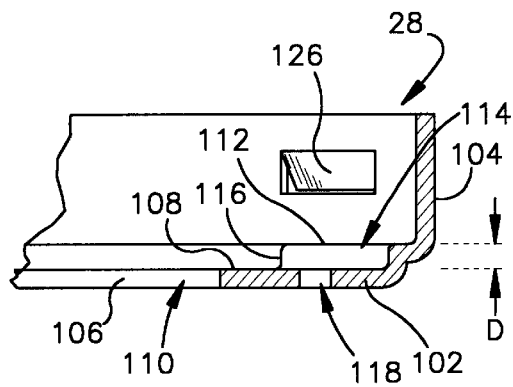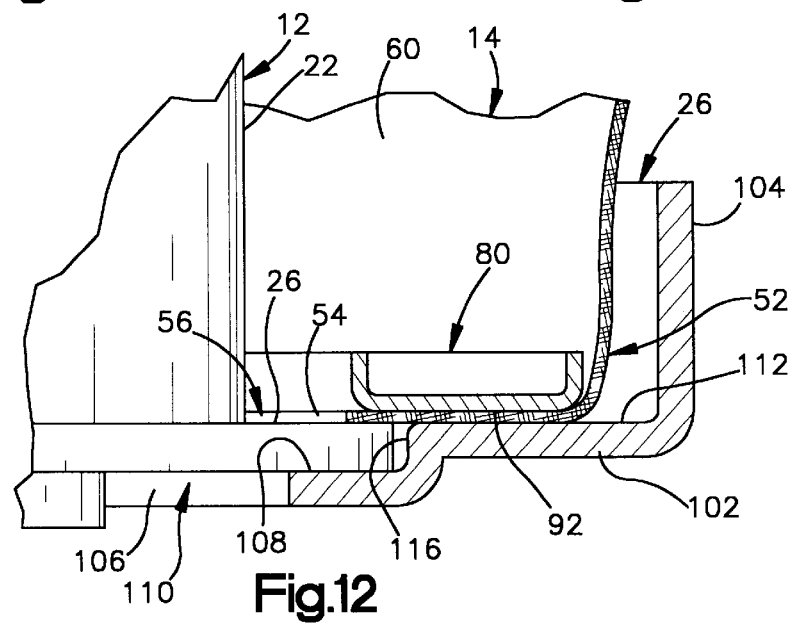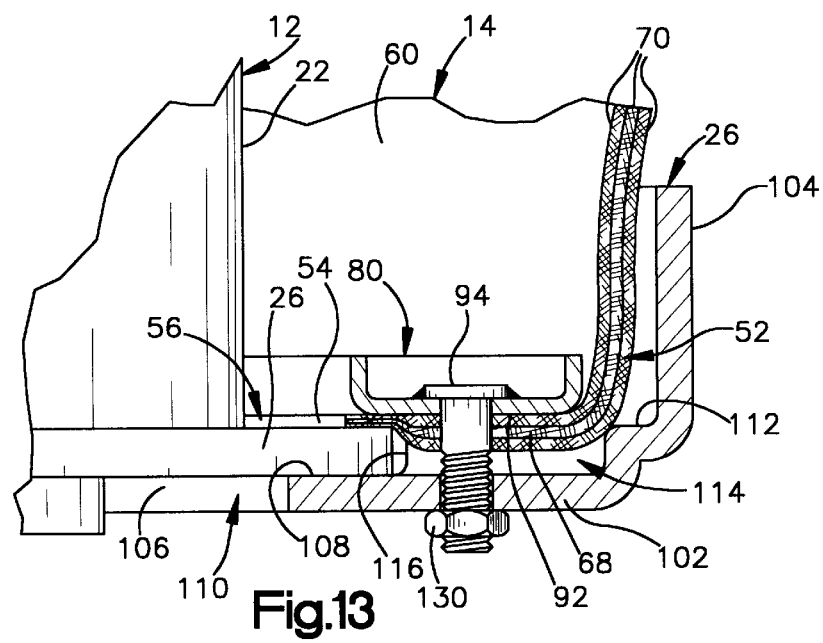

VEHICLE OCCUPANT PROTECTION APPARATUS

FIELD OF THE INVENTION

The present invention relates to an apparatus for protecting an occupant of a vehicle, and particularly relates to an apparatus including an inflatable vehicle occupant protection device.

BACKGROUND OF THE INVENTION

An inflatable vehicle occupant protection device, such as an air bag, is part of an apparatus which further includes a crash sensor and an inflator. The crash sensor senses vehicle conditions that indicate the occurrence of a crash. When the crash sensor senses a crash-indicating condition of at least a predetermined threshold level, the inflator is actuated. The inflator then emits inflation fluid which inflates the air bag into the vehicle occupant compartment to help protect an occupant of the vehicle.

An air bag and an inflator are typically assembled together as parts of an air bag module which is separate from the crash sensor. The air bag module is located in the vehicle adjacent to the vehicle occupant compartment. For example, a driver's side air bag module may be located on the vehicle steering column. A passenger side air bag module may be located in the vehicle instrument panel.

In addition to the air bag and the inflator, an air bag module typically includes a reaction structure, a retainer structure, and a cover. The reaction structure supports the inflator. The retainer structure encircles the inflator. A mouth portion of the air bag also encircles the inflator, and is clamped between the retainer structure and the reaction structure. The cover includes at least one deployment door which extends directly over the air bag to conceal the air bag and the other parts of the module from the vehicle occupant compartment.

When the inflation fluid emitted from the inflator begins to inflate the air bag, it moves the air bag outward against the deployment door on the cover. The cover is ruptured by the force of the fluid pressure acting on the air bag. The deployment door is then moved pivotally out of the path of the air bag as the air bag is inflated outward from the cover and into the vehicle occupant compartment.

SUMMARY OF THE INVENTION

In accordance with the present invention, an apparatus comprises a retainer structure, a reaction structure, and an inflatable vehicle occupant protection device. The retainer structure has a first clamping surface. The reaction structure has a second clamping surface. The protection device comprises a pair of adjacent fabric panels that are clamped between the clamping surfaces. The panels are joined along a seam which is thicker than the panels. At least one of the clamping surfaces is discontinuous across the seam to define a gap through which the seam extends. This arrangement provides clearance between the retainer structure and the reaction structure for the thickness of the seam.

BRIEF DESCRIPTION OF THE DRAWINGS

Further features of the present invention will become apparent to those skilled in the art to which the present invention relates from reading the following description with reference to the accompanying drawings, in which:

FIG. 1 is a schematic view of a vehicle occupant protection apparatus comprising a preferred embodiment of the present invention;

FIG. 2 is a schematic view showing the apparatus of FIG. 1 in an actuated condition;

FIG. 3 is a schematic view of an electrical circuit including parts of the apparatus of FIG. 1;

FIG. 4 is a partial view of a part of the apparatus of FIG. 1;

FIG. 5 is a view taken on line 5—5 of FIG. 4;

FIG. 6 is a top view of another part of the apparatus of FIG. 1;

FIG. 7 is a view taken on line 7—7 of FIG. 6;

FIG. 10 is a view taken on line 10—10 of FIG. 9;

FIG. 11 is a view taken on line 11—11 of FIG. 9; and

FIGS. 12 and 13 are views similar to FIGS. 10 and 11, respectively, showing additional parts of the apparatus in an interconnected relationship.

DESCRIPTION OF A PREFERRED EMBODIMENT

Figure 8:
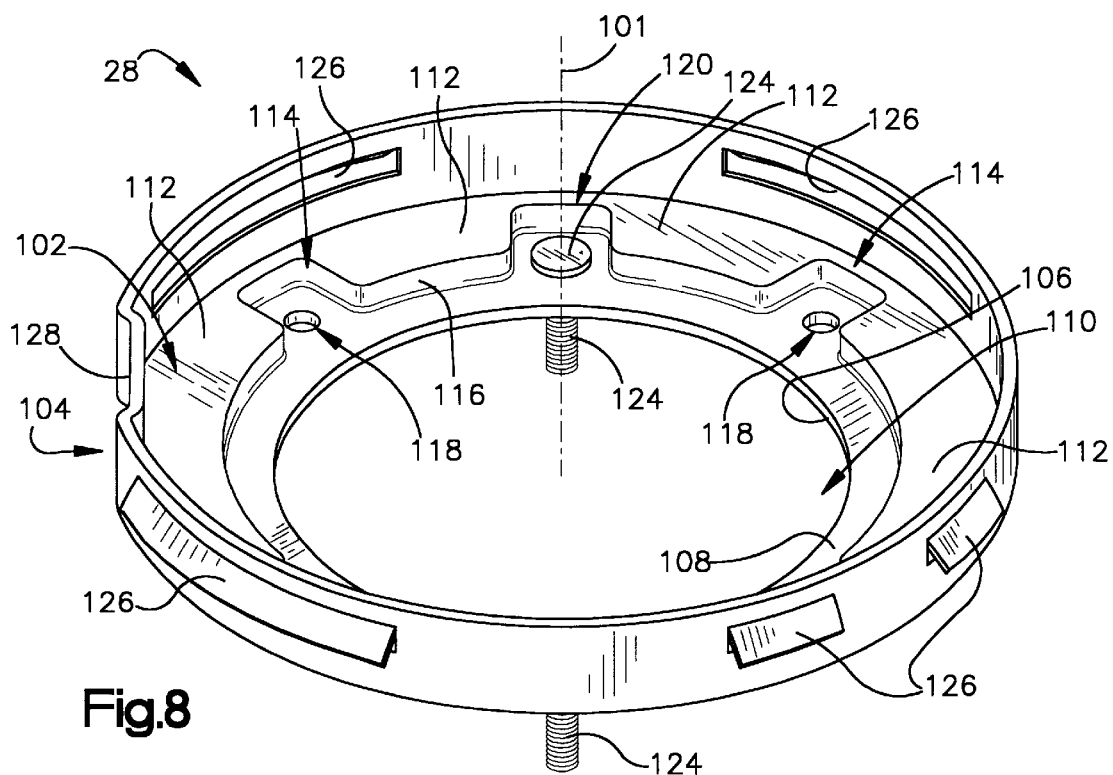
FIG. 8 is an isometric view of yet another part of the apparatus of FIG. 1.

A vehicle occupant protection apparatus 10 comprising a preferred embodiment of the present invention is shown schematically in FIGS. 1 and 2. The apparatus 10 includes an inflator 12 and a particular type of inflatable vehicle occupant protection device 14 which is commonly referred to as an air bag. In the preferred embodiment of the present invention, the air bag 14 and the inflator 12 are parts of an air bag module 16 which is mounted on a vehicle steering column 18 near the center of the steering wheel 20. The air bag 14 is inflatable from a folded, uninflated condition, as shown in FIG. 1, to an unfolded, inflated condition, as shown partially in FIG. 2. When the air bag 14 is being inflated, it moves toward the driver of the vehicle. The air bag 14 then restrains movement of the driver toward the steering wheel 20 to help protect the driver from a forceful impact with the steering wheel 20 or other parts of the vehicle.

The air bag 14 is constructed of panels that can be formed of any suitable air bag material known in the art, including woven materials and plastic films. The panels of air bag material are interconnected along seams that can be formed by stitches, ultrasonic welds, adhesives, heat-staking, or the like, depending upon the particular material of which the panels are formed. As described more fully below, the air bag 14 in the preferred embodiment of the present invention is constructed of woven fabric panels that are interconnected by stitched seams.

The inflator 12 comprises a source of inflation fluid for inflating the air bag 14. As known in the art, the inflator 12 may contain an ignitable gas generating material which, when ignited, generates a large volume of inflation gas. The inflator 12 may alternatively contain a stored quantity of pressurized inflation fluid, or a combination of pressurized inflation fluid and ignitable material for heating the inflation fluid. As shown in FIGS. 1 and 2, the inflator 12 in the preferred embodiment has a cylindrical housing 22 with a central axis 23. A circumferentially extending array of inflation fluid outlet openings 24 is located near one end of the housing 22. An annular mounting flange 26 projects radially outward at the other end of the housing 22.

The inflator housing 22 is mounted on a reaction structure 28. The reaction structure 28 may have any configuration that is suitable for supporting the housing 22 on the steering column 18. Accordingly, the reaction structure 28 may define the hub of the steering wheel 20, or may be mounted on another part (not shown) which defines the hub of the steering wheel 20, as known in the art.

The inflator 12 is included in an electrical circuit 30 (FIG. 3) with a power source 32 and a normally open switch 34. The power source 32 is preferably the vehicle battery and/or a capacitor. The switch 34 is part of a sensor 36 which senses a vehicle condition indicating the occurrence of a vehicle crash. Such a condition may comprise, for example, sudden vehicle deceleration caused by a crash. If the crash-indicating condition is at or above a predetermined threshold level, it indicates the occurrence of a crash having at least a predetermined threshold level of severity. The threshold level of crash severity is a level at which inflation of the air bag 14 is desired to restrain movement of the driver of the vehicle, as described above. The switch 34 then closes, and electric current is directed through the inflator 12 to actuate the inflator 12. As a result, the inflator 12 rapidly emits a large volume of inflation fluid which flows into the air bag 14 to inflate the air bag 14.

A cover 40 encloses the air bag 14 and the inflator 12. The cover 40 is made of a pliable plastic material which may have any suitable composition known in the art. The cover 40 includes first and second deployment door panels 42 and 44 which extend over the air bag 14. The deployment door panels 42 and 44 are held in closed positions, as shown in FIG. 1, by a rupturable section 46 of the cover 40. As the inflation fluid emitted from the inflator 12 begins to inflate the air bag 14, it moves the air bag 14 outward against the cover 40. The force of the inflation fluid pressure acting on the air bag 14 ruptures the rupturable section 46 of the cover 40 and moves the deployment door panels 42 and 44 pivotally outward, as shown in FIG. 2. As the inflation fluid continues to inflate the air bag 14, it moves the air bag 14 outward from the cover 40 past the deployment door panels 42 and 44. The structure of the cover 40, including the number and arrangement of deployment door panels and rupturable sections, can vary from the example shown schematically in the drawings.

The air bag 14 has a body 50 and a mouth 52. When the air bag 14 is being inflated from the condition of FIG. 1 to the condition of FIG. 2, the body 50 of the air bag 14 moves away from the inflator 12 toward the driver of the vehicle. The mouth 52 of the air bag 14 is retained on the reaction structure 28 with the inflator 12.

As shown in greater detail in FIG. 4, the mouth 52 of the air bag 14 has an annular inner edge surface 54 defining a circular opening 56 centered on an axis 57. The edge surface 54 is defined in part by each of four separate fabric panels 60, 62, 64 and 66 that are interconnected by four stitched seams 68. Each seam 68 joins a pair of adjacent panels 60-62, 62-64, 64-66, or 66-60 to each other. The seams 68 are elongated in directions extending radially outward from the opening 56, and are equally spaced apart circumferentially around the opening 56. Four apertures 69 in the mouth 52 of the air bag 14 extend through the seams 68 at locations equally spaced a short distance from the opening 56.

The seams 68 in the preferred embodiment have equal widths W1 and equal thicknesses T (FIG. 5) defined by overlapping plies 70 of the joined panels 60-66. Although each seam 68 in the preferred embodiment includes three overlapping plies 70 and two rows of stitches 72, as shown in FIG. 5, each seam 68 could alternatively have any other suitable configuration known in the art. However, since the thicknesses T are defined by overlapping plies 70, each seam 68 is necessarily thicker than the adjacent panels 60-62, 62-64, 64-66, or 66-68.

A retainer structure 80 is used to retain the mouth 52 of the air bag 14 on the reaction structure 28. As shown in FIG. 6, the retainer structure 80 in the preferred embodiment is a circular ring with a central axis 81. As shown in FIG. 7, the ring 80 has a channelshaped radial cross-section defined by a major portion 82 extending radially between a pair of axially projecting rim portions 84 and 86. Four apertures 88 extend through the major portion 82 between a pair of planar, axially opposite side surfaces 90 and 92. The apertures 88 are equally spaced apart circumferentially about the axis 81. Four screw-threaded fasteners 94 are received through the apertures 88, and project axially downward from the ring 80. The fasteners 94 are fixed to the ring 80 by welds 96.

Figure 9:
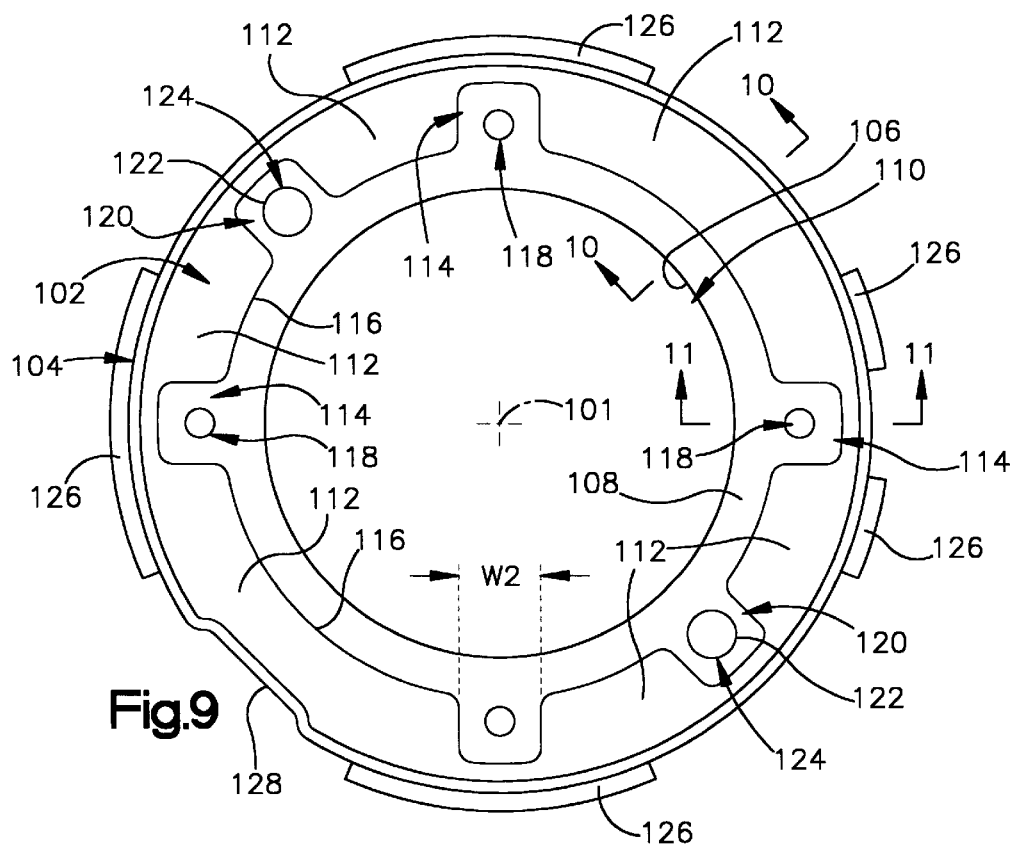
FIG. 9 is a top view of the part shown in FIG. 8.

The reaction structure 28 in the preferred embodiment also is a ring-shaped part. As shown in FIGS. 8 and 9, the reaction structure 28 has a central axis 101, an annular base wall 102, and a cylindrical side wall 104. The base wall 102 has an inner edge surface 106 and a planar mounting surface 108. The inner edge surface 106 defines a circular opening 110 centered on the axis 101. The mounting surface 108 extends radially outward from the opening 110, and extends circumferentially entirely around the opening 110.

The base wall 102 of the reaction structure 28 further has a planar clamping surface 112. The clamping surface 112 is spaced axially upward and radially outward from the mounting surface 108, and is discontinuous across four gaps 114. The gaps 114 are evenly spaced apart circumferentially about the axis 101 so as to have locations that correspond with the locations of the seams 68 (FIG. 4) in the mouth 52 of the air bag 14. Moreover, the gaps 114 are alike, and each has a width W2 (FIG. 9) which is at least as great as the width W1 of the seams 68. The axial spacing between the mounting surface 108 and the clamping surface 112, and hence the depth D (FIG. 11) of each gap 114, is determined by the height of a riser surface 116 of the base wall 102 which extends from the mounting surface 108 to the clamping surface 112. The depths D of the gaps 114 are not less than the thicknesses T of the seams 68, and are preferably somewhat greater than the thicknesses T of the seams 68. Four apertures 118 extend through the base wall 102 at locations within the four gaps 114.

The clamping surface 112 is further discontinuous across a pair of additional gaps 120. The additional gaps 120 provide clearance for the heads 122 of a pair of screw-threaded fasteners 124 that project axially downward through corresponding apertures in the base wall 102. Those fasteners 124 are used to mount the air bag module 16 (FIG. 1) on the vehicle steering column 18.

The side wall 104 of the retainer structure 28 projects axially upward from the outer periphery of the base wall 102. A plurality of locking tabs 126 on the side wall 104, as well as a partially flattened portion 128 of the side wall 104, are arranged to engage the module cover 40 (FIG. 1) in a known manner.

The mouth 52 of the air bag 14 is clamped between the retainer ring 80 and the reaction structure 28 in the arrangement shown in FIGS. 12 and 13. The ring 80 is inserted through the opening 56 in the mouth 52 of the air bag 14. The fasteners 94 projecting from the ring 80 are received through the apertures 69 in the air bag 14. The inflator 12 is placed on the base wall 102 of the reaction structure 28, with the mounting flange 26 resting on the mounting surface 108. The housing 22 is then received through the opening 56 in the mouth 52 of the air bag 14 as the mouth 52 and the ring 80 are moved coaxially downward toward and against the base wall 102. The fasteners 94 projecting from the ring 80 are then received through the apertures 118 in the base wall 102. The mouth 52 of the air bag 14 is thus engaged between the ring 80 and the flange 26, and also between the ring 80 and the clamping surface 112 of the base wall 102.

More specifically, each of the fabric panels 60, 62, 64 and 66 overlies the flange 26 beside the inner edge surface 54, and overlies the clamping surface 112 between a pair of adjacent gaps 114. Each seam 68 also overlies the flange 26 beside the inner edge surface 54. However, the seams 68 extend radially outward through the gaps 114 between adjacent portions of the clamping surface 112. Accordingly, the gaps 114 provide clearance for the thicknesses T of the seams 68 axially between the ring 80 and the reaction structure 28. This helps to prevent the seams 68 from holding the ring 80 upward from the panels 60-66 when nuts 130 (FIG. 13) are tightened onto the fasteners 94 to draw the ring 80 downward against the mouth 52 of the air bag 14.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
    a retainer structure having a first clamping surface;
    a reaction structure having a second clamping surface; and
    an inflatable vehicle occupant protection device comprising a pair of adjacent fabric panels that are joined along a seam which is thicker than said panels, said panels being clamped between said clamping surfaces by a fastening means which extends through an aperture in all of said fabric seam, said retainer and said reaction structure;
    at least one of said clamping surfaces being discontinuous across said seam to define a gap through which said seam extends, whereby clearance is provided between said retainer structure and said reaction structure for the thickness of said seam after tightening of said fastening means.

2. Apparatus as defined in claim 1 wherein said seam is defined by overlapping plies of said panels.

3. Apparatus as defined in claim 1 wherein said second clamping surface defines said gap.

4. Apparatus as defined in claim 3 wherein said reaction structure has an annular inner edge surface defining a first circular opening centered on an axis, said second clamping surface being spaced radially from said inner edge surface, said gap being one of a plurality of gaps which interrupt said second clamping surface at a corresponding plurality of locations that are spaced apart circumferentially about said axis.

5. Apparatus comprising:
    a retainer structure having a first clamping surface;
    a reaction structure having a second clamping surface; and
    an inflatable vehicle occupant protection device comprising a pair of adjacent fabric panels that are clamped between said clamping surfaces, said panels being joined along a seam which is thicker than said panels;
    at least one of said clamping surfaces being discontinuous across said seam to define a gap through which said seam extends, whereby clearance is provided between said retainer structure and said reaction structure for the thickness of said seam,
    said reaction structure has an annular inner edge surface defining a first circular opening centered on an axis, said second clamping surface being spaced radially from said inner edge surface, said gap being one of a plurality of gaps which interrupt said second clamping surface at a corresponding plurality of locations that are spaced apart circumferentially about said axis,
    said pair of adjacent fabric panels is one of a plurality of pairs of adjacent fabric panels that together define a second circular opening, said seam being one of a corresponding plurality of seams that are elongated in directions extending radially outward from said second circular opening, each of said seams extending radially outward through a corresponding one of said gaps.

6. Apparatus as defined in claim 5 wherein said retainer structure further has a planar mounting surface which extends radially-outward from said first circular opening and circumferentially entirely around said first circular opening, said apparatus further comprising an inflator having an annular mounting flange projecting radially outward from a cylindrical housing, said mounting flange resting on said mounting surface.

7. Apparatus as defined in claim 6 wherein said fabric panels and said seams are clamped between said first and second clamping surfaces, and are further clamped between said first clamping surface and said flange.

* * * * *